(12) United States Patent
Spieth et al.

(10) Patent No.: US 7,886,860 B2
(45) Date of Patent: Feb. 15, 2011

(54) ASSEMBLY SUPPORT SYSTEM

(75) Inventors: Michael Spieth, Gomaringen (DE); Guido Opperbeck, Lippstadt (DE); Ondrej Zeman, Prague (CZ)

(73) Assignees: Behr GmbH & Co. KG, Stuttgart (DE); HBPO GmbH, Lippstadt (DE)

( * ) Notice: Subject to any disclaimer, the term of this patent is extended or adjusted under 35 U.S.C. 154(b) by 415 days.

(21) Appl. No.: 11/989,987

(22) PCT Filed: Jul. 29, 2006

(86) PCT No.: PCT/EP2006/007535

§ 371 (c)(1),
(2), (4) Date: Mar. 27, 2008

(87) PCT Pub. No.: WO2007/017151

PCT Pub. Date: Feb. 15, 2007

(65) Prior Publication Data

US 2010/0133880 A1    Jun. 3, 2010

(30) Foreign Application Priority Data

Aug. 6, 2005  (DE) .................. 10 2005 039 090

(51) Int. Cl.
*B60K 11/04* (2006.01)
(52) U.S. Cl. .............. 180/68.4; 296/193.09; 165/47
(58) Field of Classification Search ............ 180/68.1, 180/68.4, 68.6; 165/41, 55, 56; 296/193.09, 296/193.1
See application file for complete search history.

(56) References Cited

U.S. PATENT DOCUMENTS

| | | | | |
|---|---|---|---|---|
| 3,123,170 A | * | 3/1964 | Bryant ................. | 180/68.4 |
| 3,225,502 A | * | 12/1965 | Hallauer ............... | 52/461 |
| 3,692,004 A | * | 9/1972 | Tangue et al. ......... | 123/41.57 |
| 3,700,061 A | * | 10/1972 | Hortnagl .............. | 180/68.4 |
| 3,795,274 A | * | 3/1974 | Fieni .................. | 165/122 |
| 3,894,580 A | * | 7/1975 | Chartet ............... | 165/67 |
| 4,137,982 A | * | 2/1979 | Crews et al. .......... | 180/68.4 |
| 4,139,053 A | * | 2/1979 | Schaal ................ | 165/71 |

(Continued)

FOREIGN PATENT DOCUMENTS

DE   102 33 626   2/2003

(Continued)

OTHER PUBLICATIONS

Search Report dated Aug. 6, 2006 for the corresponding German application.

(Continued)

*Primary Examiner*—J. Allen Shriver, II
*Assistant Examiner*—Brodie Follman
(74) *Attorney, Agent, or Firm*—Cohen Pontani Lieberman & Pavane LLP

(57) ABSTRACT

A front-end module for supporting heat exchangers in a vehicle includes a U-shaped assembly support having a horizontally extending base and two downward extending sidepieces, and a connecting support having a horizontal web which supports the heat exchangers. The assembly support is fitted over the heat exchangers, and the horizontal web is attached to the ends of the sidepieces so that the heat exchangers are surrounded and held in place.

11 Claims, 4 Drawing Sheets

U.S. PATENT DOCUMENTS

| | | | |
|---|---|---|---|
| 4,315,540 A | | 2/1982 | Moranne |
| 4,403,648 A | * | 9/1983 | Styok .......................... 165/76 |
| 4,538,697 A | * | 9/1985 | Muroi et al. ................ 180/68.4 |
| 4,651,816 A | * | 3/1987 | Struss et al. ................. 165/76 |
| 4,938,303 A | * | 7/1990 | Schaal et al. ............... 180/68.1 |
| 4,979,584 A | * | 12/1990 | Charles .................... 180/68.1 |
| 5,046,554 A | * | 9/1991 | Iwasaki et al. ............. 165/140 |
| 5,141,282 A | * | 8/1992 | Fujiwara ................. 296/193.1 |
| 5,205,349 A | * | 4/1993 | Nagao et al. ................ 165/67 |
| 5,219,016 A | * | 6/1993 | Bolton et al. ............... 165/41 |
| 5,269,367 A | * | 12/1993 | Susa et al. .................... 165/41 |
| 5,271,473 A | * | 12/1993 | Ikeda et al. ................ 180/68.4 |
| 5,476,138 A | * | 12/1995 | Iwasaki et al. ................ 165/41 |
| 5,558,310 A | * | 9/1996 | Furuie et al. ................ 248/573 |
| 5,573,299 A | * | 11/1996 | Masuda ................. 296/193.09 |
| 5,597,047 A | * | 1/1997 | Thompson et al. ......... 180/68.4 |
| 5,671,803 A | * | 9/1997 | Tepas et al. .................... 165/41 |
| 5,771,961 A | * | 6/1998 | Alizadeh .................... 165/121 |
| 5,996,684 A | * | 12/1999 | Clifton et al. ................ 165/67 |
| 6,016,774 A | * | 1/2000 | Bokkers et al. ............ 123/41.1 |
| 6,073,594 A | * | 6/2000 | Tsukiana et al. .......... 123/41.33 |
| 6,155,335 A | * | 12/2000 | Acre et al. ..................... 165/41 |
| 6,158,500 A | * | 12/2000 | Heine .......................... 165/67 |
| 6,202,737 B1 | * | 3/2001 | Mahe .......................... 165/67 |
| 6,227,321 B1 | | 5/2001 | Frascaroli et al. |
| 6,237,676 B1 | * | 5/2001 | Hasegawa et al. ............. 165/67 |
| 6,273,182 B1 | * | 8/2001 | Pautler et al. ................ 165/67 |
| 6,298,906 B1 | * | 10/2001 | Vize ........................... 165/41 |
| 6,318,450 B1 | * | 11/2001 | Acre ............................ 165/67 |
| 6,386,273 B1 | * | 5/2002 | Hateley ....................... 165/67 |
| 6,405,819 B1 | * | 6/2002 | Ohkura et al. ............. 180/68.1 |
| 6,412,581 B2 | * | 7/2002 | Enomoto et al. ........... 180/68.4 |
| 6,450,276 B1 | | 9/2002 | Latcau |
| 6,470,961 B1 | * | 10/2002 | Case ........................... 165/78 |
| 6,510,891 B2 | * | 1/2003 | Anderson et al. ............ 165/67 |
| 6,622,783 B2 | * | 9/2003 | Hitt et al. ................... 165/121 |
| 6,634,127 B2 | * | 10/2003 | Bauer .......................... 40/792 |
| 6,668,956 B1 | * | 12/2003 | Pelage et al. ............. 180/68.4 |
| 6,672,416 B1 | * | 1/2004 | Guyomard et al. ......... 180/68.4 |
| 6,684,937 B2 | | 2/2004 | Lenz et al. |
| 6,685,258 B2 | | 2/2004 | Brogly et al. |
| 6,691,772 B2 | * | 2/2004 | Manaka ..................... 165/149 |
| 6,705,387 B2 | * | 3/2004 | Kokubunji et al. ............. 165/67 |
| 6,789,606 B2 | * | 9/2004 | Ohki ........................... 165/41 |
| 6,817,404 B2 | * | 11/2004 | Frana-Guthrie et al. ........ 165/43 |
| 6,901,992 B2 | * | 6/2005 | Kent et al. .................... 165/67 |
| 6,973,984 B2 | * | 12/2005 | Cheron et al. .............. 180/68.1 |
| 7,036,561 B2 | * | 5/2006 | Yagi et al. ..................... 165/67 |
| 7,036,617 B2 | * | 5/2006 | Harada ....................... 180/68.4 |
| 7,044,203 B2 | * | 5/2006 | Yagi et al. .................... 165/122 |
| 7,114,587 B2 | * | 10/2006 | Mori et al. ................. 180/68.3 |
| 7,117,926 B2 | | 10/2006 | Mori et al. |
| 7,121,369 B2 | * | 10/2006 | Beck et al. ................. 180/68.4 |
| 7,287,613 B2 | * | 10/2007 | Kim ........................... 180/68.4 |
| 7,325,592 B2 | * | 2/2008 | Cristante et al. ............ 165/121 |
| 7,331,413 B2 | * | 2/2008 | Okai et al. ................. 180/68.4 |
| 7,350,609 B2 | * | 4/2008 | Udo et al. .................. 180/68.4 |
| 7,363,961 B2 | * | 4/2008 | Mori et al. ..................... 165/41 |
| 7,367,379 B2 | * | 5/2008 | Heine ............................ 165/67 |
| 7,410,018 B2 | * | 8/2008 | Satou ......................... 180/68.4 |
| 7,418,994 B2 | * | 9/2008 | Evans et al. ................... 165/41 |
| 7,467,679 B2 | * | 12/2008 | Honzek et al. ............. 180/68.4 |
| 7,481,287 B2 | * | 1/2009 | Madson et al. ............. 180/68.1 |
| 7,562,504 B2 | * | 7/2009 | Herbst et al. .................. 52/461 |
| 7,637,309 B2 | * | 12/2009 | Contet ......................... 165/67 |
| 7,640,966 B2 | * | 1/2010 | Maeda et al. .................. 165/41 |
| 7,669,640 B2 | * | 3/2010 | Vincent et al. ................. 165/41 |
| 2001/0010275 A1 | * | 8/2001 | Sasano et al. .............. 180/68.1 |
| 2001/0013405 A1 | * | 8/2001 | Mangold ..................... 165/67 |
| 2001/0019098 A1 | * | 9/2001 | Guyomard ................. 248/562 |
| 2001/0040026 A1 | * | 11/2001 | Halm .......................... 165/153 |
| 2001/0045310 A1 | * | 11/2001 | Ozawa et al. .............. 180/68.1 |
| 2002/0038700 A1 | * | 4/2002 | Gille .......................... 165/140 |
| 2002/0056541 A1 | * | 5/2002 | Kokubunji et al. ............. 165/67 |
| 2002/0070003 A1 | * | 6/2002 | Lenz et al. ..................... 165/41 |
| 2002/0129981 A1 | * | 9/2002 | Satou ......................... 180/68.6 |
| 2003/0034153 A1 | * | 2/2003 | Hitt et al. .................... 165/149 |
| 2003/0062148 A1 | * | 4/2003 | Ohki ............................ 165/41 |
| 2003/0168270 A1 | * | 9/2003 | Maeda et al. .............. 180/68.4 |
| 2003/0178235 A1 | * | 9/2003 | Cheron et al. ............. 180/68.1 |
| 2003/0192727 A1 | * | 10/2003 | Mori et al. ................. 180/68.4 |
| 2004/0011513 A1 | | 1/2004 | Haneda et al. |
| 2004/0035551 A1 | * | 2/2004 | Tamura et al. ................. 165/41 |
| 2004/0069443 A1 | * | 4/2004 | Yagi et al. ..................... 165/41 |
| 2004/0115997 A1 | * | 6/2004 | Scherer et al. .............. 439/752 |
| 2004/0188155 A1 | * | 9/2004 | Fujieda ..................... 180/68.4 |
| 2004/0195020 A1 | * | 10/2004 | Suwa et al. ................. 180/68.4 |
| 2004/0200598 A1 | | 10/2004 | Hitt et al. |
| 2005/0121170 A1 | * | 6/2005 | Maeda et al. .................. 165/67 |
| 2005/0134093 A1 | | 6/2005 | Borkowski et al. |
| 2005/0217907 A1 | * | 10/2005 | Madson et al. ............. 180/68.1 |
| 2005/0279547 A1 | * | 12/2005 | Udo et al. .................. 180/68.4 |
| 2006/0081354 A1 | * | 4/2006 | Miura et al. .................... 165/41 |
| 2006/0090878 A1 | * | 5/2006 | Levasseur et al. ............. 165/67 |
| 2006/0102399 A1 | * | 5/2006 | Guilfoyle et al. ........... 180/68.1 |
| 2006/0169442 A1 | * | 8/2006 | Cristante et al. ............ 165/121 |
| 2006/0213639 A1 | * | 9/2006 | Kobayashi et al. ............. 165/67 |
| 2006/0237175 A1 | * | 10/2006 | Hara ......................... 165/140 |
| 2007/0119564 A1 | * | 5/2007 | Contet ......................... 165/67 |
| 2007/0125525 A1 | * | 6/2007 | Heine ......................... 165/121 |
| 2008/0023173 A1 | * | 1/2008 | Savage ......................... 165/41 |
| 2008/0061601 A1 | * | 3/2008 | Hemmersmeier ...... 296/193.03 |
| 2008/0100066 A1 | * | 5/2008 | Mueller et al. ................. 292/24 |
| 2008/0135209 A1 | * | 6/2008 | Lowe et al. ..................... 165/77 |
| 2008/0251040 A1 | * | 10/2008 | Gubbles .................... 123/41.49 |
| 2008/0308333 A1 | * | 12/2008 | Kapadia et al. ............. 180/68.4 |
| 2009/0039674 A1 | * | 2/2009 | Hassdenteufel et al. .. 296/180.1 |
| 2009/0050385 A1 | * | 2/2009 | Guilfoyle et al. ........... 180/68.1 |
| 2010/0003858 A1 | * | 1/2010 | Myers ........................ 439/638 |
| 2010/0044007 A1 | * | 2/2010 | Sensui et al. ................... 165/67 |
| 2010/0060039 A1 | * | 3/2010 | Riviere ................... 296/193.09 |
| 2010/0078149 A1 | * | 4/2010 | Yoshimitsu et al. ........... 165/67 |

FOREIGN PATENT DOCUMENTS

| | | |
|---|---|---|
| EP | 1 413 467 | 4/2004 |
| EP | 1 413 501 | 4/2004 |
| FR | 2 805 497 | 8/2001 |
| WO | WO 03/053768 | 7/2003 |

OTHER PUBLICATIONS

Search Report dated Sep. 28, 2006 issued for the underlying International Application No. PCT/EP2006/07535.

Preliminary Examination Report dated Mar. 12, 2008 issued for the underlying international application.

* cited by examiner

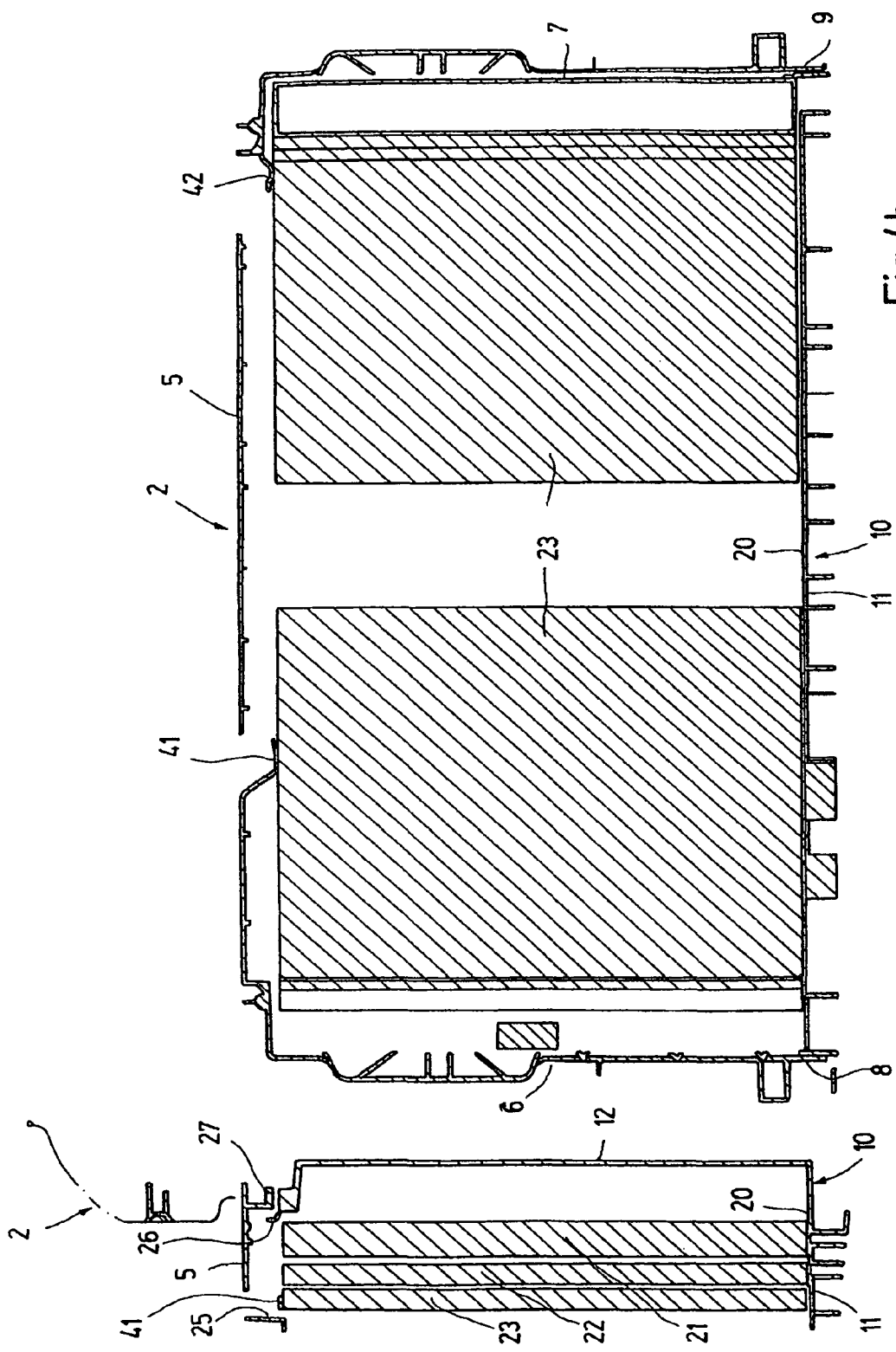

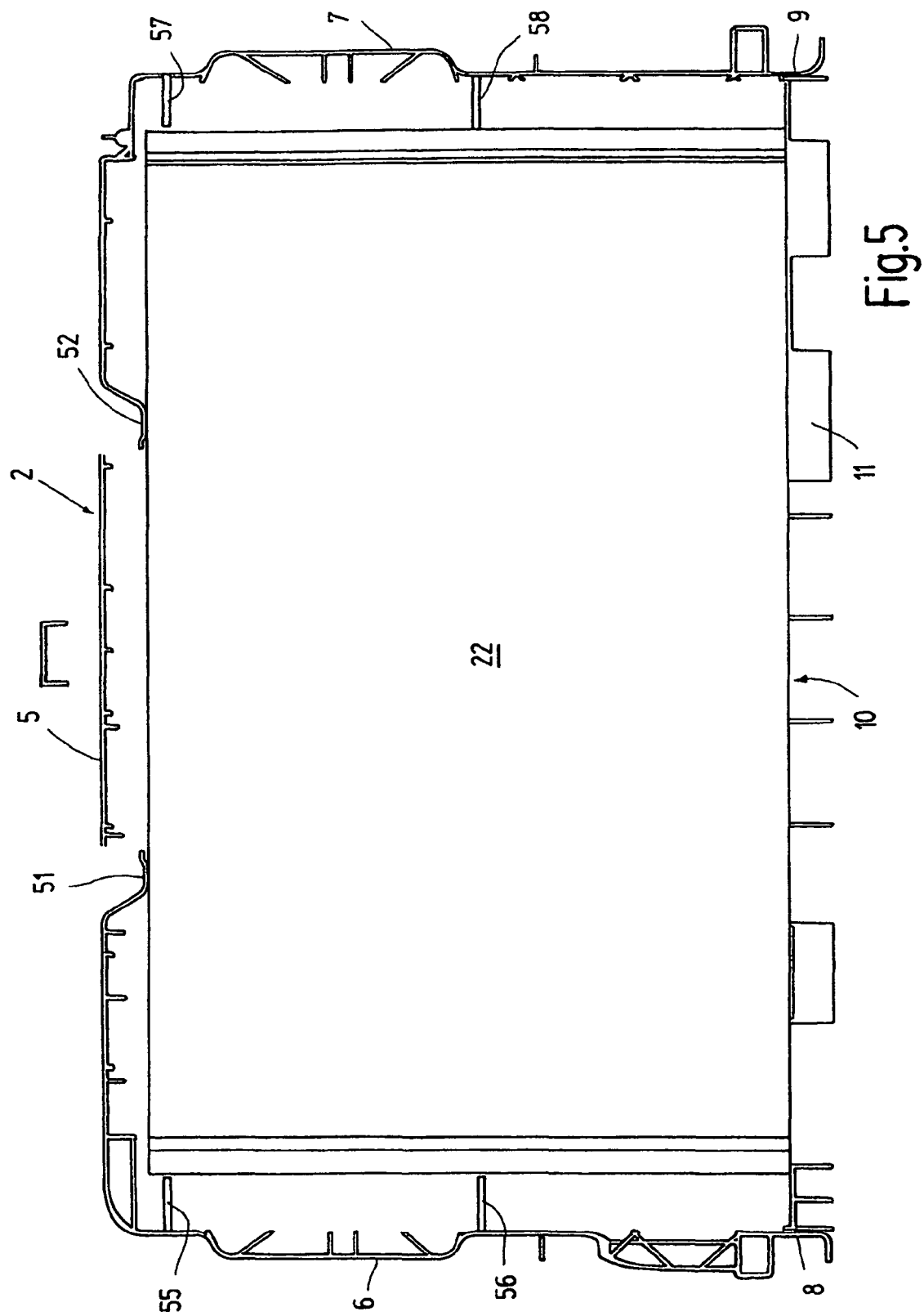

ASSEMBLY SUPPORT SYSTEM

CROSS-REFERENCE TO RELATED APPLICATIONS

This is a U.S. national stage of International Application No. PCT/EP2006/07535, filed on 29 Jul. 2006. Priority is claimed on German Application No. 10 2005 039 090.0, filed on 6 Aug. 2005.

BACKGROUND OF THE INVENTION

1. Field of the Invention

The invention pertains to an assembly support system, especially a front-end module, for cooling components, especially for at least one heat exchanger and at least one fan frame, the system comprising an assembly support.

2. Description of the Related Art

A front-end module which comprises a closed assembly frame, to which a fan frame can be attached, is known from U.S. Pat. No. 6,685,258 B2. The fan frame forms the rear wall of an installation space for cooling components.

SUMMARY OF THE INVENTION

An object of the invention is to create an assembly support system, especially heat exchangers and a fan frame, to form a module which simplifies the preassembly of the cooling components.

In an assembly support system, especially in a front-end module, for cooling components, especially for at least one heat exchanger and at least one fan frame, the assembly support is designed essentially in the form of a "U" with a base, from which two sidepieces extend, the ends of which are connected by a separate connecting support. Before assembly, the assembly support is not connected at the ends by the connecting support and thus is open on one side. This greatly simplifies the installation of the cooling components. After assembly, the connecting support completes the assembly support to form a closed assembly support frame, in which the cooling components are installed. The inventive assembly support system makes it possible to preassemble the components outside a motor vehicle assembly line with only one primary assembly direction. The present invention is preferably aimed at the use of all-metal cooling components without any additional soldered-on fastening means within the assembly support system.

A preferred exemplary embodiment of the assembly support system is characterized in that, in the installed state of the assembly support system, the two sidepieces of the assembly support extend downward. This directional specification pertains to a motor vehicle, for example, in which the inventive assembly support system has been installed. In this context, therefore, "downward" means vertically toward the bottom of the vehicle.

Another preferred exemplary embodiment of the assembly support system is characterized in that the connecting support has an essentially L-shaped cross section with a first arm, especially a short arm, which forms a connecting web between the ends of the two sidepieces, and with a second arm, especially a long arm. The long arm of the connecting support forms a closing wall or rear wall of an installation space for the cooling components. The assembly support closed by the L-shaped rear wall forms a stiff assembly, which, after installation on the vehicle, represents an additional thrust-absorbing assembly for the vehicle.

Another preferred exemplary embodiment of the assembly support system is characterized in that the first arm of the connecting support has a support surface for at least one cooling component, especially for at least one heat exchanger. Preferably several heat exchangers are held or supported in the vertical direction by this support surface.

Another preferred exemplary embodiment of the invention assembly support system is characterized in that the first arm of the connecting support extends forward from the rear in the longitudinal direction of the vehicle. As a result, it is possible to remove the assembly support in the installed state of the assembly support system without having to remove the connecting support with the cooling components. This offers the advantage that the cooling circuits do not have to be opened when removing the assembly support.

Another preferred exemplary embodiment of the assembly support system is characterized in that the support surface for the cooling component, especially for the heat exchanger, has at least one positive-locking area for the positive mounting of an area of complementary design of the cooling component. As a result, the cooling component is secured in position in the longitudinal direction of the vehicle.

Another preferred exemplary embodiment of the assembly support system is characterized in that, on the side facing the cooling component, the base of the assembly support has retaining elements, which hold the cooling component in place in the longitudinal direction of the vehicle. The retaining elements are preferably formed by positioning ribs, which rest on the heat exchanger or are arranged between two heat exchangers.

Another preferred exemplary embodiment of the inventive assembly support system is characterized in that, on the side facing the cooling component, the base of the assembly support has spring elements, which are spring-loaded against the cooling component. As a result, it is guaranteed that the cooling component is supported without play.

Another preferred exemplary embodiment of the invention assembly support system is characterized in that the connecting support is attached to the ends of the sidepieces of the assembly support. The connecting support is fastened preferably in a detachable manner; that is, it can be disconnected from the ends of the sidepieces of the assembly support without being destroyed. Screws, clips, or rivets can be used as fastening elements.

Another preferred exemplary embodiment of the assembly support system is characterized in that at least one elastic sealing element is provided along the sides and/or on top of each cooling component, between the cooling component and the assembly support. The sealing element also serves to compensate for manufacturing tolerances.

Another preferred exemplary embodiment of the assembly support system is characterized in that the sealing element has an essentially U-shaped cross section, which extends around the cooling component. As a result, tolerances both in the lateral or vertical direction and also in the longitudinal direction of the vehicle can be compensated.

Another preferred exemplary embodiment of the assembly support system is characterized in that several heat exchangers are arranged on the first arm of the connecting support, i.e., the arm with the support surface, in such a way that they are enclosed by the assembly support. The preassembly of the inventive assembly support system or of the front end is preferably carried out in sequence from back to front in the longitudinal direction of the vehicle. During preassembly, the connecting support is first laid in an assembly jig. The connecting support preferably has the capacity to accommodate one or more cooling fans and other devices, such as fan shutters which open at high backpressures. The support surface is designed to hold and to support the cooling components. According to one aspect of the invention, formations are provided in the support surface of the connecting support, these being formed during the production of the connecting support by injection-molding. Correspondingly designed complementary opposing pieces of geometrically similar form are provided on the cooling components. After the cooling components have been installed on the support surface of the connecting support, the cooling components are thus held in place by a positive connection both in the downward direction and also in the longitudinal direction of the vehicle.

Another preferred exemplary embodiment of the assembly support system is characterized in that the second arm of the connecting support forms a rear wall, which comprises a fan frame. Preferably the rear wall also comprises a fan motor and other devices such as fan shutters.

Another preferred exemplary embodiment of the inventive assembly support system is characterized in that the assembly support and the connecting support are produced by injection-molding. The assembly support is preferably produced by a hybrid form of the injection-molding process. The connecting support is also preferably produced by injection-molding. The assembly support and the connecting support are preferably made of plastic; and, if necessary, a metal reinforcing piece can be provided in the area of the first arm of the connecting support.

Additional advantages, features, and details of the invention can be derived from the following description, in which, with reference to the drawings, various exemplary embodiments are described in detail. The features mentioned in the claims and in the description can be essential to the invention either individually or in any desired combination:

BRIEF DESCRIPTION OF THE DRAWINGS

FIG. 4a shows a longitudinal cross section through the assembly support system of FIG. 1 in the assembled state;

FIG. 4b shows a cross section through a heat exchanger of the assembly support system of FIG. 1; and FIG. 5 shows a cross section through a heat exchanger different from that of FIG. 4b of the assembly system according to FIG. 1.

DETAILED DESCRIPTION OF THE PREFERRED EMBODIMENTS

Figure 1:
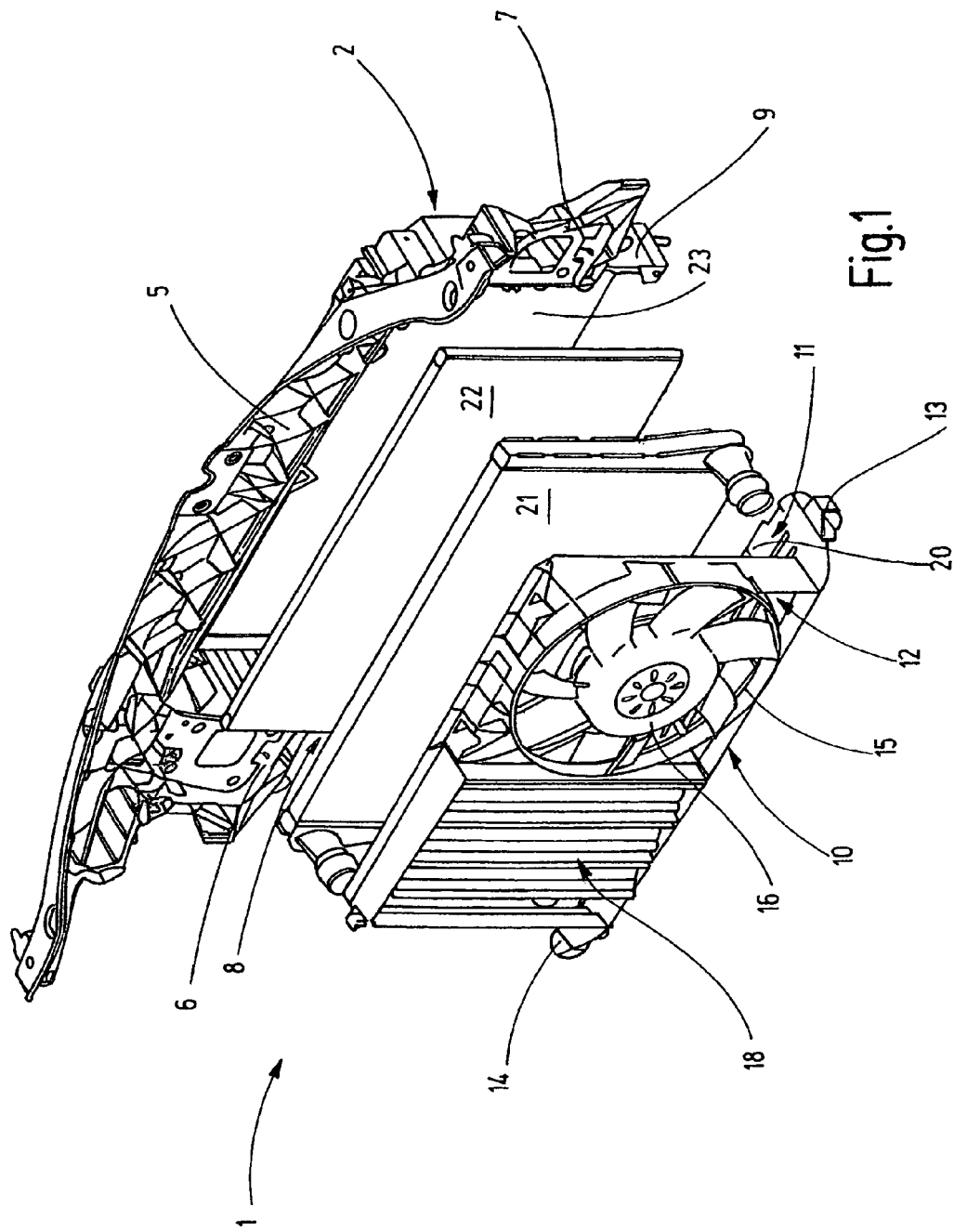
FIG. 1 shows an exploded view, in perspective, of an inventive assembly support system.

FIG. 1 shows an exploded perspective view of the inventive assembly support system 1. The assembly support system 1 comprises an assembly support 2, which is designed essentially in the form of a "U". The assembly support 2 comprises a base 5, from which two sidepieces 6, 7 extend downward. The free ends 8, 9 of the sidepieces 6, 7 can be connected by a connecting support 10. The connecting support 10 has an essentially L-shaped cross section with a first, short arm 11 and a second, long arm 12. At each of the lateral ends of the first arm 11, the connecting support 10 has a fastening element 13, 14. The fastening elements 13, 14 are used to attach the connecting support 10 to the ends 8, 9 of the sidepieces 6, 7 of the assembly support 2. In the assembled state, the first, short arm 11 of the connecting support 10 forms a connecting web 11 between the free ends 8, 9 of the sidepieces 6, 7 of the assembly support 2.

The second, long arm 12 of the connecting support 10 forms a rear wall of a cooling component installation space, which is also bounded by the assembly support 2 extending between the sidepieces 6, 7. The rear wall formed by the second, long arm 12 of the connecting support 10 comprises a fan frame 15 with a fan rotor 16 and an associated fan motor. The rear wall also comprises fan shutters 18.

The first, short arm 11 of the connecting support 10 forming the connecting web has a support surface 20 for three heat exchangers 21, 22, and 23. Heat exchanger 21 is a water cooler. Heat exchanger 22 is a low-temperature cooler. Heat exchanger 23 is an air-conditioning condenser. Heat exchangers 21-23, which are also called cooling components, are, according to an essential aspect of the present invention, premounted on the support surface 20 of the connecting support 10. The preassembled system consisting of the connecting support 10 and the three heat exchangers 21-23 is closed by the attachment of the assembly support 2. Attaching the assembly support 2 to the connecting support 10 has the effect of holding the cooling components 21-23 securely in place in the assembly system 1.

Figure 2:
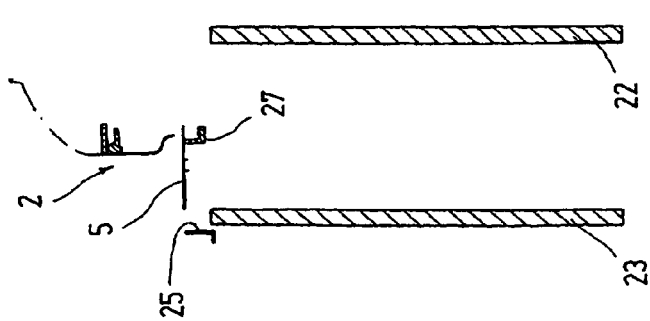
FIG. 2 shows a longitudinal cross section through the assembly support system of FIG. 1 before assembly.

FIG. 2 shows a longitudinal cross section through the assembly support system 1 of FIG. 1. In the longitudinal cross section, we can see that, at the front end of the assembly support 2, there is a stop strip 25 for the top edge of the heat exchanger 23. In addition, there is an upward-curving retaining finger 26 at the top edge of the second, long arm 12 of the connecting support 10. In the assembled state of the assembly support 2 and the connecting support 10, this retaining finger grips a projection 27 on the assembly support 2.

Figure 3:
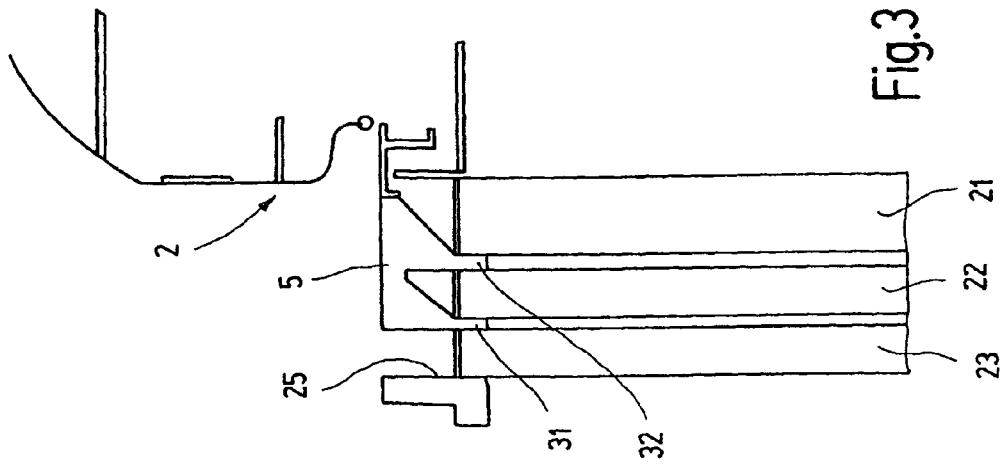
FIG. 3 shows a longitudinal cross section, on an enlarged scale, through part of the assembly support system of FIG. 1 in the assembled state.
Figure 3:
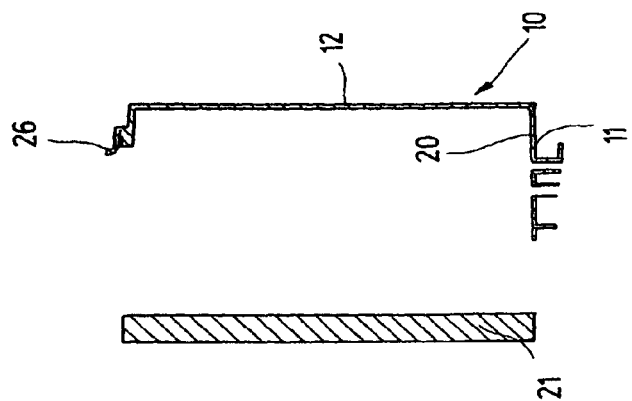

FIG. 3 shows an enlarged longitudinal cross section of part of the assembly support system of FIG. 1. We see in FIG. 3 that there are downward-pointing positioning ribs 31, 32 on the base 5 of the assembly support 2. The positioning rib 31 is located between the heat exchangers 23 and 22 and serves to hold the two heat exchangers 23, 22 in place in the longitudinal direction of the vehicle.

FIGS. 4a and 4b show various cross-sectional views of the inventive assembly support system in the assembled state. The heat exchangers 21-23 are enclosed by the assembly support 2 and the connecting support 10, which form a closed frame around the periphery. Spring elements 41, 42, which hold the heat exchanger 23 in place in the vertical direction, are provided on the base 5 of the assembly support 2.

FIG. 5 shows a cross section similar to that of FIG. 4b but through a different point. In FIG. 5 we see that spring elements 51, 52, which proceed from the base 5 of the assembly support 2, are also resting on the top edge of the heat exchanger 22. In addition, the heat exchanger 22 is held in position laterally by the ribs 55, 56 formed on the sidepiece 6 and by the ribs 57, 58 formed on the sidepiece 7 of the assembly support 2. The ribs 55, 58 are preferably oriented in the main mold-removal direction of the injection mold used to produce the assembly support 2. Depending on the shape and arrangement of the ribs or spring elements, extractor can be used to ensure that the part can be removed from the mold.

The inventive assembly support system 1 is assembled in sequence from back to front, looking in the direction of vehicle travel. First, the L-shaped rear wall with the mounting openings for one or more cooling fans and for other devices such as fan shutters which open at high backpressure is placed in an assembly jig. The first, short arm 11 of the connecting support 10 forms the support surface 20 for the cooling components 21-23. According to one aspect of the present invention, positive-locking areas for the positive attachment of areas of the cooling components of complementary design are provided in the support surface 20.

To increase the thermal efficiency of the mounted cooling components 21-23, a sealing profile can be used around the sides and/or on the top. This profile is preferably U-shaped, so that it can extend around the sides in one piece and thus enclose the individual cooling components. Such a profile also makes it possible to compensate for manufacturing tolerances.

After all the cooling components 21-23 have been mounted on the support surface 20, proceeding from back to front, the assembly support 2 can then be placed on the connecting support 10 with the cooling components 21-23 and thus complete the enclosure. Similar to the way in which the cooling components 21-23 are supported from underneath in the support surface 20 of the connecting support 10, comparable retaining elements of the cooling components also engage in the assembly support 2, which has been placed on top from the front. The U-shaped assembly support 2, which is open toward the bottom, is designed to fit the cooling components on which it rests in such a way that a play-free connection is guaranteed between the cooling components and the connecting support.

For the play-free support of the cooling components in the vertical direction, the bottom side of the base 5 of the assembly support 2 is equipped with molded-on spring elements 41, 42, 51, 52. The lower area of the assembly support 2 is connected by screws, clips, rivets, etc., to the connecting support 10; this can be done from the front, which facilitates the assembly process. Connecting the assembly support 2 positively or nonpositively to the connecting support 10 completes the closure and forms a sealed box around the cooling components 21-13, at the same time providing the desired flow-exposed surface at the front and the intended venting surfaces at the rear. The assembly support 2, which has been closed off by the connecting support, forms a stiff assembly, which, after installation in the vehicle, represents and additional thrust-absorbing assembly for the vehicle.

The inventive assembly support system can be easily adapted to the number and capacity of the various cooling components used within a design series comprising motors of different ratings or different sets of vehicle equipment without the need to invest heavily in molds.

The assembly support 2 and the connecting support 10 are preferably produced out of plastic by a hybrid method with inlaid metal parts by the injection-molding process. As a result of the inventive assembly support system, a uniform assembly direction, beginning from the back and proceeding to the front or top, is made possible. There is no need for any assembly jigs for attaching the cooling components. The cooling components 21, 22, 23 are held in place by ribs on the assembly support and by the recesses in the support surface for the cooling components in the assembly support system. The L-shaped rear wall 12 with the fan frame cooperates with the assembly support 2 to form a closed installation space for the cooling components with predetermined guidance of the air flow.

What is claimed is:

1. A front-end module for supporting heat exchangers in a vehicle having a front and a back defining a longitudinal direction, the module comprising:
    an assembly support having a horizontally extending base and two sidepieces extending downward from the base, each sidepiece having an end remote from said base;
    a connecting support connecting the ends of the sidepieces, the connecting support comprising a fan frame and having an L-shaped cross section with a first arm and a second arm, the first arm comprising a horizontal web having lateral ends and forming a support surface for the heat exchangers, wherein fastening elements at each of the lateral ends of the horizontal web and at a lower portion of the connecting support connect the ends of the sidepieces to the connecting support.

2. The module of claim 1 wherein the first arm extends from the second arm toward the front of the vehicle.

3. The module of claim 1 wherein the support surface comprises means for positively attaching at least one of said heat exchangers.

4. The module of claim 1 wherein the base of the assembly support comprises retaining elements which hold the heat exchangers in place in the longitudinal direction of the vehicle.

5. The module of claim 1 wherein the base of the assembly support comprises spring elements which are spring loaded downward against the heat exchangers.

6. The module of claim 1 further comprising at least one sealing element provided between the heat exchangers and the assembly support.

7. The module of claim 1 wherein each said sealing element fits against the base and the sidepieces of the assembly support.

8. The module of claim 1 wherein each said heat exchanger is surrounded by the support surface, the sidepieces, and the base.

9. The module of claim 1 wherein the second arm forms a rear wall of the connecting support, the fan frame being formed in the rear wall.

10. The module of claim 1 wherein the assembly support and the connecting support are injection-molded parts.

11. The module of claim 1 wherein the assembly support is configured to provide an additional thrust-absorbing assembly for the vehicle after installation in the vehicle.

\* \* \* \* \*